July 7, 1964 G. W. McININCH ETAL 3,139,759
AUXILIARY TRANSMISSION FOR TRACTORS
Filed May 10, 1962 3 Sheets-Sheet 1
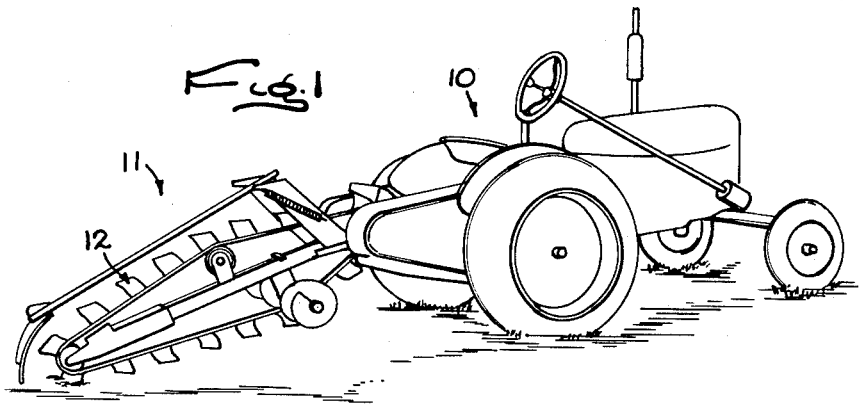
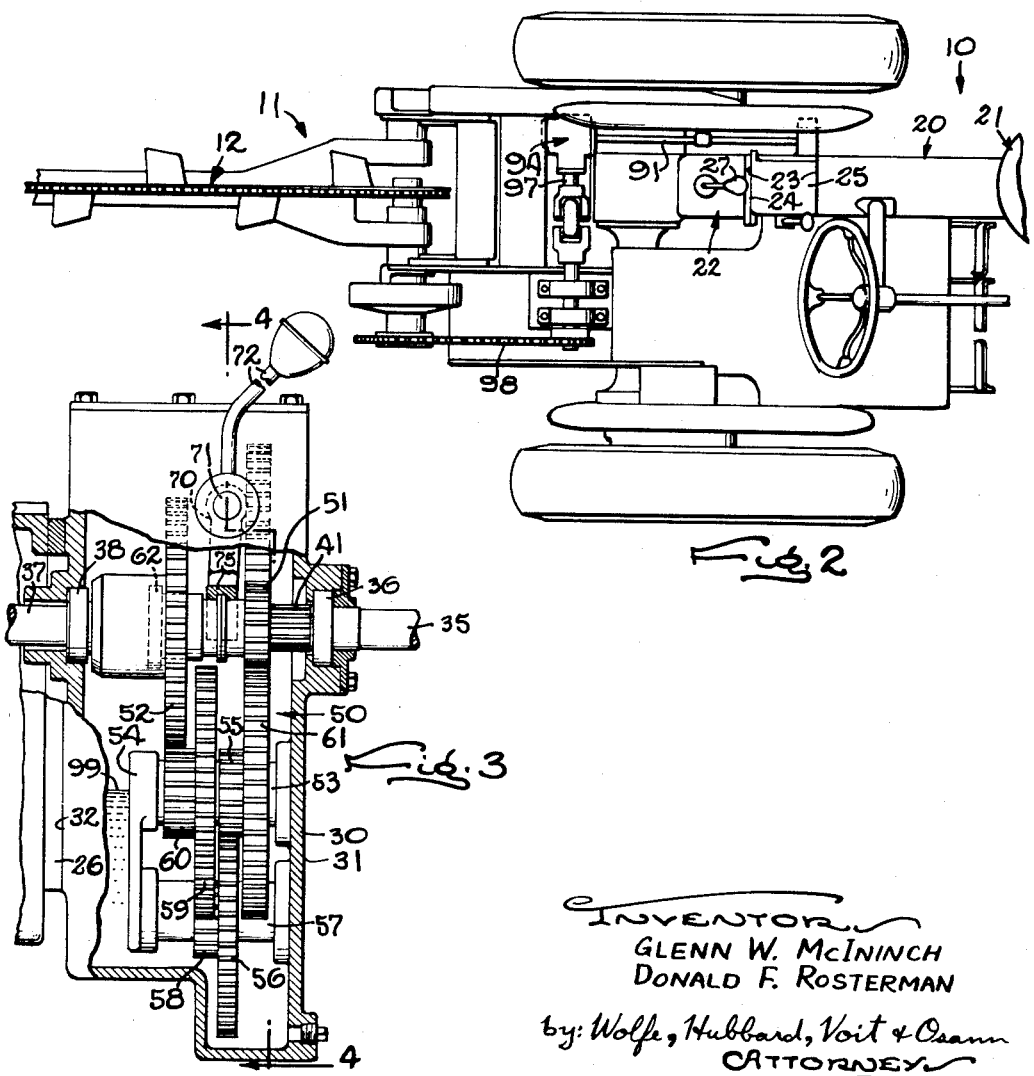
INVENTORS
GLENN W. McININCH
DONALD F. ROSTERMAN
by: Wolfe, Hubbard, Voit & Osann
ATTORNEYS

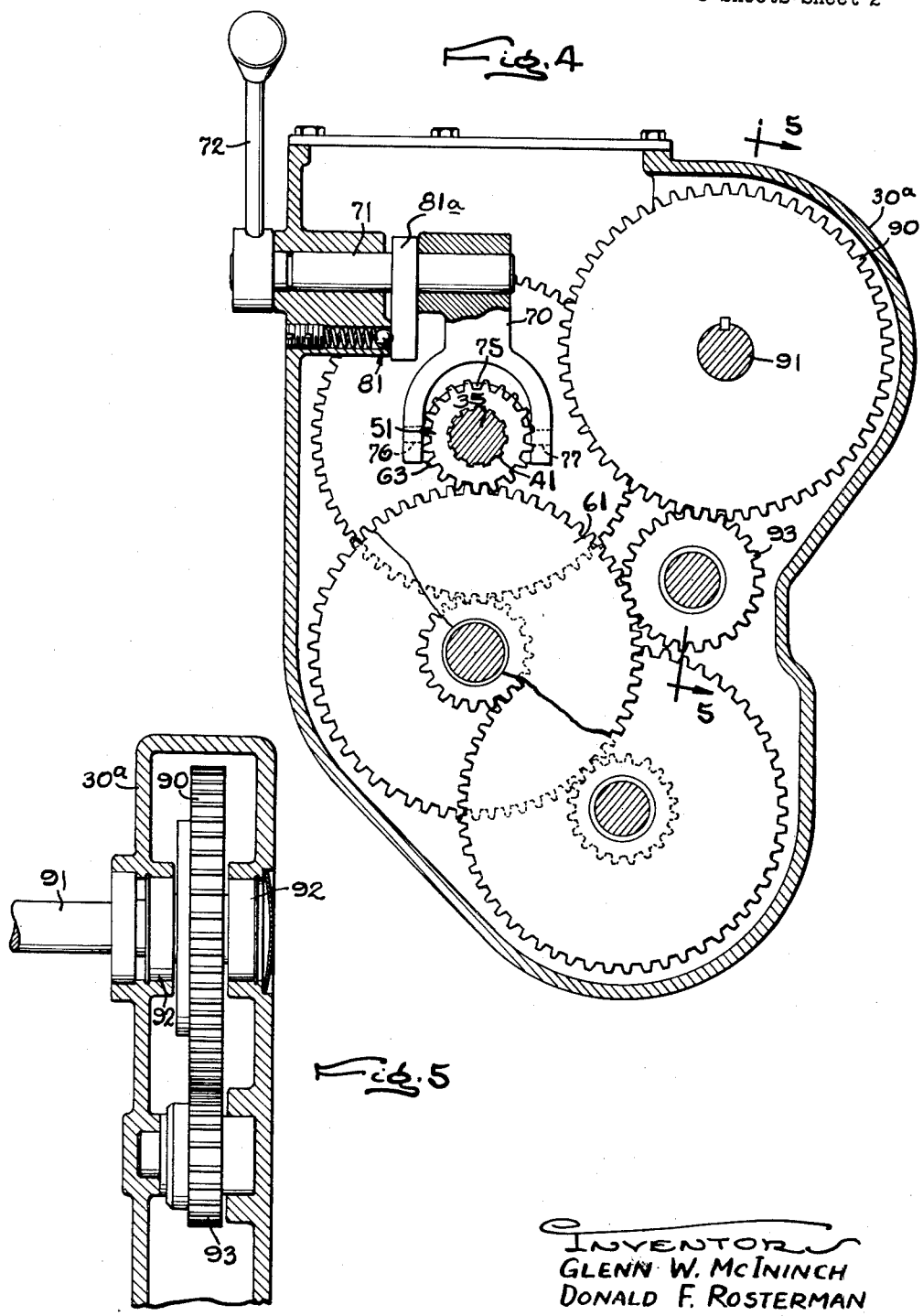

July 7, 1964   G. W. McININCH ETAL   3,139,759
AUXILIARY TRANSMISSION FOR TRACTORS
Filed May 10, 1962   3 Sheets-Sheet 3
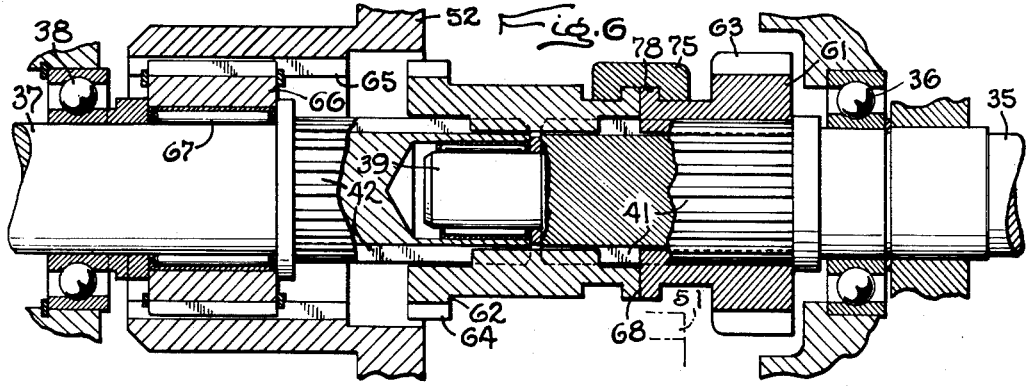
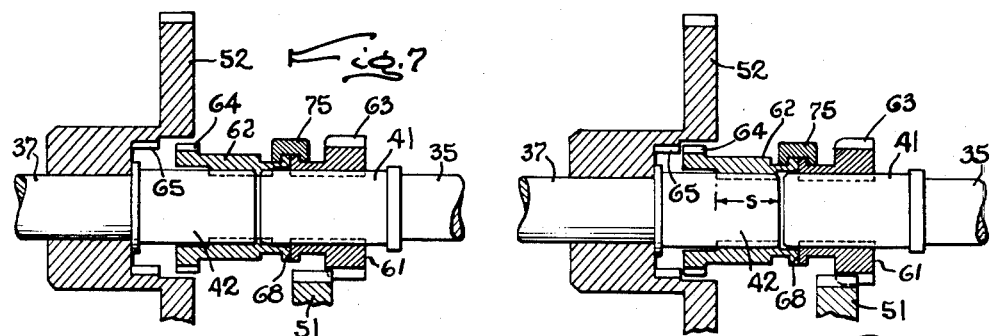
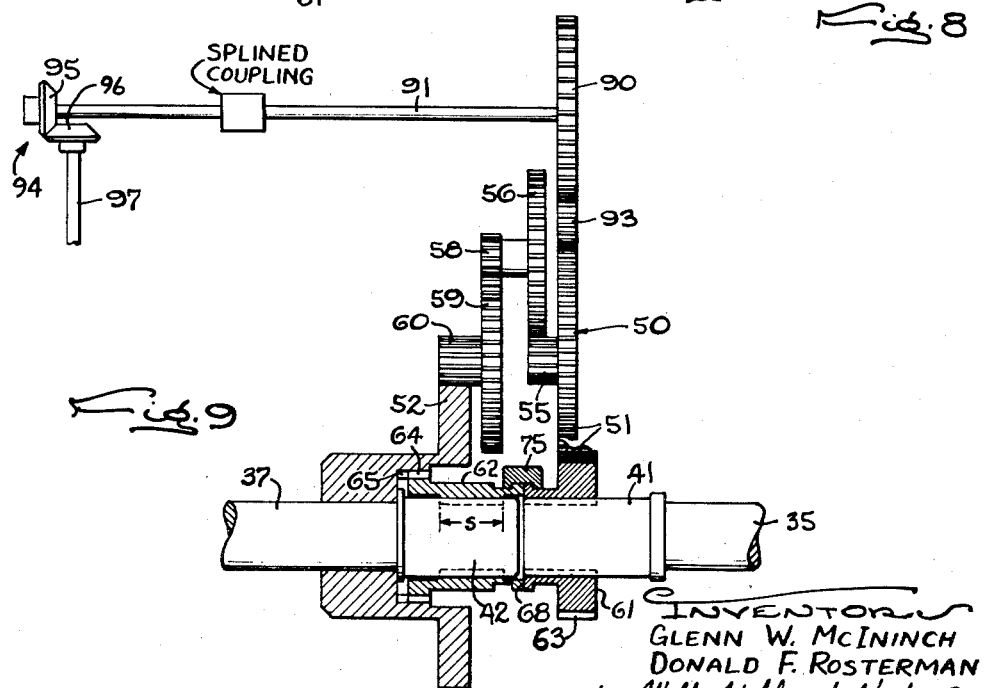
INVENTORS
GLENN W. McININCH
DONALD F. ROSTERMAN
by: Wolfe, Hubbard, Voit & Osann
ATTORNEYS

United States Patent Office 3,139,759
Patented July 7, 1964

3,139,759
AUXILIARY TRANSMISSION FOR TRACTORS
Glenn W. McIninch, Omaha, and Donald F. Rosterman, Auburn, Nebr., assignors to Auburn Machine Works, Inc., Auburn, Nebr., a corporation of Nebraska
Filed May 10, 1962, Ser. No. 193,817
8 Claims. (Cl. 74—15.6)

The present invention relates to trenching attachments, and more particularly to an auxiliary stepdown driving arrangement for converting a conventional tractor for use as a trencher.

The gear selection provided on a conventional farm tractor does not provide the necessary slow inching speed and high torque required for trenching purposes. To secure the slow speed it is known to employ an auxiliary stepdown driving connection, or auxiliary transmission, commonly referred to as a "spacer," between the separable forward and rear portions of the tractor body. An example of this is to be found in prior George et al. Patent No. 2,810,293, issued October 22, 1957. However, prior devices of this type have not provided for powering of the digger chain so that a special chain drive has been necessary at the rear end of the tractor for stepping down from the relatively high speed of the PTO shaft to the slower speed required for driving the chain. Moreover, in prior devices it is conventional for the stepdown gears to rotate idly when the device is in a "straight through" driving mode which results in undue wear and noise particularly where the vehicle is operated at highway speeds when going from one job to the next.

Accordingly it is an object of the present invention to provide an auxiliary stepdown driving connection or transmission, which is designed to be interposed between the separated portions of the tractor body and which has a novel provision for providing power take off for the digger chain. It is another object to provide an auxiliary speed reducing unit in which the same gearing is utilized to produce a slow inching speed at the tractor wheels and to produce a desired running speed at the sprocket of the digger chain. It is another object to supply in a device of the above type a stepdown driving train having novel provision for completely uncoupling or silencing the same under conditions where a straight-through driving connection is established as, for example, in travel of the tractor over the highway from job to job. In this connection it is an object to provide an auxiliary transmission in which the gearing is not subject to wear under transport conditions. The gear train does not produce the noise or "whine" which is characteristic of conventional devices.

It is a more specific object to provide an auxiliary transmission which has novel provision for connecting the input element and output element of the gear train in timed sequence. Thus it is an object to provide an auxiliary drive connection which permits smooth yet positive shifting between the straight through and step-down modes of operation without the necessity for "jockeying" to secure driving engagement when starting from rest.

Other objects and advantages of the invention will become apparent upon reading the attached detailed description and upon reference to the drawings in which:

FIGURE 1 is a side perspective view of a trenching vehicle employing the present invention.

FIG. 2 is a fragmentary top view of the rear portion of the tractor shown in FIG. 1 and showing the interposed auxiliary transmission and auxiliary power take off shaft.

FIG. 3 is a vertical section taken through the auxiliary transmission shown in FIG. 2 and with the stepdown gear train in mesh.

FIG. 4 is a front end view taken along the line 4—4 in FIG. 3 with the front wall of the housing broken away.

FIG. 5 is a fragmentary section taken through the power take off output gear along the line 5—5 in FIG. 4.

FIG. 6 is a fragmentary view showing the sliding gears in position to produce straight through drive.

FIGS. 7 and 8 show engagement of the input gear of the gear train as the sliding gears move progressively through neutral position.

FIG. 9 shows the gears moved to the final position in which the input and output gears of the gear train are both engaged to provide a stepdown driving connection.

While the invention has been described in connection with a preferred embodiment, it will be understood that the invention is not limited to the particular embodiment shown but on the contrary, it is intended to cover the various alternate and equivalent constructions included within the spirit and scope of the appended claims.

Turning to FIGS. 1 and 2 there is shown a tractor 10 having a trenching boom 11 secured at the rear end thereof and about which is trained a digger chain 12. The tractor will be recognized as the well known "Cub" tractor which is one of the smallest tractors, in terms of size and horsepower, intended for general usage. The tractor has a central housing or body 20 running fore and aft which consists of two separate portions, a forward portion 21 which contains the clutch and mounts the engine and a rear portion 22 which houses the regular vehicle transmission and which is integral with the tractor rear axle housing. The mating faces of the two portions are flanged as indicated at 23, 24 and are normally bolted together. In the practice of the present invention the two portions are separated as shown in FIG. 2 and an auxiliary transmission, constructed in accordance with the invention, indicated at 25 is interposed between them. To facilitate making mechanical connection to the rear portion 22 of the tractor body, an adaptor plate or mounting plate 26 (FIG. 3) is interposed. The regular transmission shift lever is indicated at 27.

The auxiliary transmission has a hollow frame or housing 30 providing a front wall or mounting surface 31 and a rear mounting surface 32 for securing to the portions 21, 22 respectively of the tractor.

Projecting into the housing 30 of the auxiliary transmission is an input drive shaft 35 mounted in a bearing 36. Projecting rearwardly from the auxiliary transmission is an output drive shaft 37 mounted in a bearing 38. The two drive shafts are arranged end to end. To maintain them in alinement they preferably have an overlapping connection indicated at 39 provided with an antifriction bushing or the like. The end of the input shaft carries a spline 41 while the adjacent end of the output shaft has a spline 42. The drive shafts 35, 37 are substituted for the input and output drive shaft furnished with the tractor.

For the purpose of providing speed stepdown, and torque multiplication, between the input shaft and output shaft a spur gear train 50 is provided having an input gear 51 and an output gear 52. Referring more specifically to the gear train 50, it will be noted that the gear 51 is mounted on a stub shaft 53, the right hand end of which is mounted in the wall 31 and the left hand end of which is mounted in a web or bracket 54 integrally formed in the housing. Integral with the gear 51 is a pinion 55. This pinion meshes with a second gear 56 which is mounted on a second stub shaft 57 and the left hand end of which is also secured in the web 54. The gear 56 has a pinion 58 formed integrally therewith which meshes with a third gear 59. The latter is mounted upon the stub shaft 53 adjacent the gear 51 and includes an integral pinion 60. The latter, in turn, meshes with the output gear 52 previously referred to. In a practical case the gears 51, 56, 59 and 52, with their associated pinions, may be used to produce a stepdown driving ratio on the order of 50:1, preferably 81:1. Because of the "folded back" nature of the gear train, the input and output gears having the same center, a high stepdown ratio may be achieved using ordinary spur gears with a high degree of compactness. Conveniently the input gear lies adjacent the end 41 of the input shaft while the output gear 52 surrounds the end 42 of the output shaft.

In accordance with the present invention a novel arrangement of sliding input and output gears is provided, splined on the ends of the input and output shafts, respectively, having teeth for meshing with the input and output gears of the gear train, and with means being provided for simultaneously shifting the gears between engaging and disengaged positions. In the present instance the sliding gears are indicated at 61, 62, respectively. The sliding input gear is splined to engage the spline 41 and has teeth 63 formed on its outer surface of a width which is substantially the same as the width of the gear 51. The sliding gear 62 associated with the output shaft is internally splined and carries teeth 64 on its outer surface. Such teeth are meshed with the teeth of an internal spline 65 formed within the hub of the output gear 52. To facilitate cutting the spline 65, a splined insert 66 is telescoped into the output gear 52 to serve as a spacer or bushing. Interposed between the insert and the shaft 37 is an anti-friction bearing 67 of the needle type. With the sliding gears 61, 62 in the position shown in FIG. 3, both the input and output gears of the gear train are engaged to provide a stepdown driving connection between the input and output shaft. Under such conditions the two gears 61, 62 rotate at different speeds, with slippage taking place at the junction 68 between them.

In carrying out the present invention, means are provided for simultaneously shifting the sliding gears from the position shown to a position in which one of such gears bridges the splines on the input and output shafts thereby to provide a straight-through connection which is useful when the tractor must proceed from one job to another at highway speeds. This shifting is accomplished in the present instance by a shifter fork 70 which is mounted on a rockable shifter rail 71 which is journaled in the side wall of the housing and which terminates in a shifting arm 72. At its lower end the shifter fork 70 mounts a shifting collar 75 having trunnions 76, 77 and which has an internal annular channel 78 which holds the adjacent ends of the gears 61, 62 captive. A ball detent 81 cooperates with registering depressions in the detent arm 81a to assist in positioning the shifter arm 72 to secure the two modes of operation.

It is one of the features of the present invention that in putting the gear train into operation engagement or meshing takes place first at the input gear 51 followed, after a short time interval, by meshing at the gear 52. The manner in which this is accomplished will be made clear upon considering the stop motion views of FIGS. 6 to 9, inclusive. FIG. 6 shows the sliding gears 61, 62 in the extreme right hand position with both the input gear 51, and the output gear 52 of the gear train disengaged and with the internal spline of the gear 62 bridging the spline at 41, 42 of the input and output shafts. It may be noted at this point that to facilitate the breaking of the straight through connection the spline formed on the inside of the sliding gear 62 does not extend the full length. Rather the spline occupies only the left hand portion of the gear 62 over a distance which has been indicated as "s" in the drawing. When it is desired to move into the neutral position which separates two modes of operation, the control arm 72 is moved to shift the gears 61, 62 through the positions shown in FIGS. 7 and 8 where the input gear 51 is engaged setting the gear train 50 in motion but without meshing at the output gear. Such "neutral" condition is but a short transition between the two modes of operation and no separate "neutral" detent is provided for the control arm.

Finally the control arm moves to its end position in which the output sliding gear 62 engages the output gear 52. This engagement occurs by reason of the meshing of the teeth 64 on the sliding gear with the spline 65 formed on the output gear. Because of the fact that the gear train is rotating at the time that the output connection is made, the spline 64 on the gear 62 will quickly and positively find its seated position in the spline 65. This is significant since the output shaft is normally stationary when the stepdown drive connection is made and, absent rotation of the output gear 52, it is possible that there would be interference between the splines 64, 65 which would prevent the connection from being made. Stated in other words, the sequential coupling which characterizes the present device makes it unnecessary to jockey the tractor or to employ trial and error until the stepdown drive connection is established. In the present instance the sequencing is brought about by making the spline 64, which engages at the output end, narrower than the gear 63, which effects coupling at the input. However, it will be apparent that the invention is not limited to any particular width relation and it will be apparent to one skilled in the art that the sequencing may be brought about by making other geometrical modifications without departing from the invention.

While the above-mentioned meshing is abrupt, there is no shock on the system since the regular vehicle transmission is, at such time, in neutral.

It is one of the features of the present invention that, in addition to providing stepdown for the tractor wheels, the auxiliary transmission provides a novel take off for the digger chain utilizing the gearing of the auxiliary transmission and providing an auxiliary outboard PTO shaft which rotates at a speed which is only a fraction of that of a regular PTO shaft for direct drive of the digger chain without substantial further reduction. More specifically, in accordance with the invention, the housing 30 of the auxiliary transmission is provided with an extension to accommodate a power take off gear having a shaft which lies outboard of the auxiliary transmission and tractor body to a 90° angle drive mounted at the rear of the tractor thereby to provide a transversely extending drive shaft for direct drive of the digger chain sprocket. Thus it will be noted in FIGS. 2, 4 and 5 that the auxiliary transmission housing is extended outwardly at 30a to house a power take-off output gear 90 having an auxiliary power take-off shaft 91 journaled in bearings 92. To drive the power take-off gear an idler gear 93 is provided which, as shown in FIG. 4, meshes with the gear 51 of the auxiliary transmission. Because of the reduction in speed, the power take-off shaft 91 rotates at a speed of 600 r.p.m. under normal digging conditions. This is to be contrasted with a speed of rotation of the usual "Cub" power take-off shaft, namely, 1800 r.p.m.

At the rear end of the shaft 91 a right angle drive connection is provided as indicated at 94 which may, for example, have bevel gears 95, 96 for driving a laterally projecting chain drive shaft 97. The angle drive connection 94 may be simple and compact and may, if desired, have a 1:1 driving ratio. However, it is preferred to make the bevel gears of unlike size thereby to provide a slight additional stepdown on the order of 23:19 yielding 496 r.p.m. The shaft 97 is directly coupled to the sprocket of chain 98 as set forth in FIG. 2.

It will be apparent that by utilizing an outboard PTO shaft which lies on the opposite side of the tractor from the digger chain many of the usual problems involved in utilizing a regular vehicle PTO are avoided. Instead of having to provide the large stepdown ratio normally required from a high speed PTO in a small space, a simple L-shaped driving connection has been made which provides direct coupling to the chain sprocket. Substantially all of the step down required is provided right in the auxiliary transmission thereby greatly simplifying the mechanism at the tractor rear end and resulting in a substantial reduction in cost combined with ease of installation and servicing. Moreover, when the stepdown gearing within the auxiliary transmission is disabled or silenced for highway transport, it will be apparent that the chain drive, which is coupled to it, is also automatically silenced without necessity for providing a separate PTO cutoff. As a result the gear reduction and chain drive may be turned on and off simultaneously by the single control arm 72. This provides a measure of safety as well as convenience.

It is one of the features of the present arrangement that the auxiliary transmission is located ahead of the regular transmission and directly behind the tractor clutch. Thus depressing the clutch serves to cut off the flow of power to both the tractor wheels and the digger chain. Moreover, since the regular transmission under the control of the shift lever 27, is to the rear of the auxiliary transmission, a large measure of flexibility of operation is provided. Not only may the inching speed be varied under trenching conditions by selection of one of the regular gear settings but also, by placing the regular shift lever in neutral, the chain may be driven via the auxiliary transmission when the vehicle is stationary. This is especially desirable when starting a cut or for test or maintenance purposes.

The present device does not require any separate lubrication system. Since the housing 30 is of hollow construction and sealed from the tractor housing it lubricates itself with oil normally rising to about the level indicated at 99 in FIG. 3. Splash lubrication takes care of lubricating the upper gear elements within the housing.

Not only is the auxiliary transmission and driving arrangement described above inherently simple but it permits the ultimate of simplicity in the boom and digger chain construction and mounting. As a result a complete trenching installation upon a "Cub" type tractor may be made for a fraction of the cost of conventional trenching equipment. Yet the unit is capable of performing efficiently all but the heaviest chores assigned to the larger units. The installation need not be factory made and the total attachment may be furnished in the form of a kit for installation by the tractor owner.

While the auxiliary transmission described above with its auxiliary power take-off shaft is particularly well suited for the driving of a digger chain for trenching purposes, it will be understood that the auxiliary transmission is not limited to trenching usage but may be employed wherever an inching or creeping drive is desired and wherever an auxiliary source of power is required at the rear end of the tractor for the driving of a tractor attachment.

We claim:

1. An auxiliary transmission for a tractor of the type having a body including forward and rear sections separable along mating surfaces comprising, in combination, a housing having end faces adapted to be connected to the respective mating surfaces of the body, alined input and output shafts projecting into the housing and arranged end to end, a spur gear train in said housing providing speed stepdown and including an input gear and an output gear, a first slidable gear on the input shaft and rotatable therewith for coupling the same to the input gear, a second slidable gear on the output shaft and rotatable therewith for coupling the same to the output gear, and means for moving the slidable gears so that the first slidable gear is coupled to the input gear to initiate rotation of the spur gear train and so that the second slidable gear is thereafter coupled to the output gear, the ends of the shafts having splines thereon, and at least one of said slidable gears being internally splined so that, when the slidable gears are moved in a direction to uncouple the spur gear train, continued movement thereof moves the splined gear into bridging relation with the splines on the shafts for a straight-through drive connection between the input and output shaft.

2. An auxiliary transmission for a tractor of the type having a body including forward and rear sections separable along mating surfaces comprising, in combination, a housing having end faces adapted to be connected to the respective mating surfaces of the body, alined input and output shafts projecting into the housing and arranged end-to-end, a gear train in said housing providing speed stepdown and including an input gear and an output gear, first and second slidable gears splined on the ends of the input and output shafts respectively, means for moving the slidable gears in unison so that the first slidable gear is coupled to the input gear to produce initial rotation of the gear train and so that the second slidable gear is thereafter coupled to the output gear to complete the stepdown drive connection, the splines on the ends of the shafts being mated so that when the slidable gears are moved in the opposite direction to uncouple the gear train continued movement thereof causes one of the slidable gears to bridge the splines on the shaft for a straight-through drive connection between the input and output shaft.

3. An auxiliary transmission for a tractor of the type having a body including forward and rear sections separated along mating surfaces comprising, in combination, a housing having end faces adapted to be secured to the respective mating surfaces of the body, alined input and output shafts projecting into the housing and arranged end to end, a stepdown gear train in said housing having an input gear and an output gear arranged adjacent the ends of the input and output shafts respectively, first and second sliding gears slidably splined on the ends of the respective shafts, means for moving the slidable gears simultaneously from a first position in which one of said slidable gears bridges the splines on the ends of the shafts for a straight-through drive connection, second position in which the first slidable gear is meshed with the input gear of the gear train to put the gear train into initial motion, and a third position in which the slidable gear on the output shaft is additionally meshed with the output gear to provide a stepdown driving connection from the input shaft to the output shaft.

4. An auxiliary transmission for a tractor of the type having a body including forward and rear sections separated along mating surfaces comprising, in combination, a housing having end faces adapted to be secured to the respective mating surfaces of the body, alined input and output shafts projecting into the housing and arranged end-to-end, a stepdown gear train in said housing having an input gear and an output gear arranged adjacent the ends of the input and output shafts respectively, first and second sliding gears slidably splined on the ends of the respective shafts, a manually shiftable collar holding said sliding gears captive side-by-side for moving the gears simultaneously from a first position in which one of said slidable gears bridges the splines on the ends of the shafts for a straight-through drive connection, a second position in which the first slidable gear is meshed with the input gear of the gear train to put the gear train into initial motion, and a third position in which the slidable gear on the output shaft is additionally meshed with the output gear to provide a stepdown driving connection from the input shaft to the output shaft.

5. An auxiliary transmission for a tractor of the type having a body including forward and rear sections separated along mating surfaces comprising, in combination, a housing having end faces adapted to be secured to the respective mating surfaces of the body, alined input and output shafts projecting into the housing and arranged end to end, a stepdown spur gear train having input and output gears positioned adjacent the ends of the input and output shafts respectively, first and second sliding gears slidably splined on the ends of the respective input and output shaft, said housing being laterally extended beyond the profile of the tractor body and having a power take-off output gear journaled therein in an outboard position, said power take-off gear being constantly in engagement with one of the reduction gears in the gear train for rotation at a speed which is substantially less than the speed of the input shaft, an auxiliary power take-off shaft connected to the power take-off gear and extending in outboard position rearwardly along the side of the tractor body, means at the rear end of the auxiliary power take-off shaft for driving a digger chain or the like, and means for shifting said slidable gears from a first position in which the gears are meshed with their respective input and output gears for driving of the gear train and for simultaneous driving of the power take-off shaft and a second position in which means movable with one of the slidable gears bridges the splined ends of the input and output shafts for providing a straight-through drive connection accompanied by silencing of the gear train and power take-off shaft.

6. An auxiliary transmission for a tractor of the type including a body having forward and rear sections separable along mating surfaces comprising, in combination, a housing having end faces adapted to be secured to the respective mating surfaces on the body, alined input and output shafts projecting into the housing and arranged end to end, a stepdown gear train in said housing having input and output gears arranged adjacent the ends of the input and output shafts, said housing having an outboard lateral extension projecting beyond the profile of the tractor body, a power take-off output gear journaled in said extension and constantly engaged with one of the reduction gears of the gear train for rotation whenever the gear train is in operation, an auxiliary power take-off shaft extending rearwardly from the power take-off gear in outboard position adjacent the tractor body and terminating at the rear end of the tractor, a chain drive shaft rotatably mounted at the end of the tractor in transversely extending position, and a right angle drive connection interposed between the auxiliary power take-off shaft in the chain drive shaft, means for coupling the ends of the input and output shafts respectively to the input and output gear of the gear train to establish a stepdown drive connection through the gear train accompanied by relatively slow speed rotation of the auxiliary power take-off shaft, and means for alternatively coupling the input and output shafts together to establish a straight-through drive connection while silencing the gear train and auxiliary power take-off shaft.

7. For use with a tractor having an engine, clutch and transmission with the latter being coupled to the tractor driving wheels, the combination comprising an auxiliary transmission having an input and an output and a stepdown gear train, means including a manual control element for connecting the input directly to the output to establish a straight-through driving connection and, alternatively, to connect the gear train between the input and output to establish a stepdown driving connection, an auxiliary power take-off coupled to one of the gears in the gear train, the auxiliary transmission being connected between the clutch and regular tractor transmission so that the auxiliary power take-off shaft may be powered by engaging the clutch with the regular transmission in neutral without accompanying movement of the tractor.

8. For use with a tractor having a longitudinal body including an engine, clutch and transmission with the latter being coupled to the tractor driving wheels, the combination comprising an auxiliary transmission unit having a frame insertable in the tractor body, said unit having an input and an output and a stepdown gear train, shiftable means including a manual control element and movable into a fixed position in which the input is connected directly to the output to establish a straight-through driving connection and in which the gear train is disconnected from both said input and output, said shifted means being movable into a second position in which the gear train is connected to the input and output to establish a stepdown driving connection and in which the direct connection between the input and the output is removed, an auxiliary power take-off gear coupled to one of the gears in the gear train, the auxiliary transmission being connected between the clutch and regular tractor transmission and said auxiliary power take-off gear having a shaft which extends from said frame outboard of the tractor body to an offset position at the rear end of the tractor for driving a trenching chain or the like.

References Cited in the file of this patent

UNITED STATES PATENTS

| 2,749,756 | George | June 12, 1956 |
| 2,761,322 | Ronan | Sept. 4, 1956 |

FOREIGN PATENTS

| 960,039 | France | Apr. 11, 1950 |